(12) United States Patent
Lin

(10) Patent No.: US 9,625,730 B2
(45) Date of Patent: Apr. 18, 2017

(54) LENTICULAR PRINT THREE DIMENSIONAL IMAGE DISPLAY DEVICE AND METHOD OF FABRICATING THE SAME

(75) Inventor: Anshyang Albert Lin, Raritan, NJ (US)

(73) Assignee: ACTEGA NORTH AMERICA, Inc., Delran, NJ (US)

(*) Notice: Subject to any disclaimer, the term of this patent is extended or adjusted under 35 U.S.C. 154(b) by 339 days.

(21) Appl. No.: 14/648,334

(22) PCT Filed: Jul. 27, 2012

(86) PCT No.: PCT/US2012/048541
§ 371 (c)(1),
(2), (4) Date: May 29, 2015

(87) PCT Pub. No.: WO2013/048614
PCT Pub. Date: Apr. 4, 2013

(65) Prior Publication Data
US 2015/0293366 A1    Oct. 15, 2015

(51) Int. Cl.
| | | |
|---|---|---|
| G02B 27/22 | (2006.01) |
| B29D 11/00 | (2006.01) |
| G02B 3/00 | (2006.01) |
| G09F 19/14 | (2006.01) |
| B05D 3/06 | (2006.01) |
| H04N 1/00 | (2006.01) |
| B41M 3/06 | (2006.01) |

(52) U.S. Cl.
CPC ......... *G02B 27/2214* (2013.01); *B05D 3/067* (2013.01); *B29D 11/00278* (2013.01); *B29D 11/00365* (2013.01); *G02B 3/005* (2013.01); *G02B 3/0012* (2013.01); *G09F 19/14* (2013.01); *B41M 3/06* (2013.01); *H04N 1/00201* (2013.01)

(58) Field of Classification Search
CPC  G02B 3/0012; G02B 3/005; B29D 11/00278; B29D 11/00365
See application file for complete search history.

(56) References Cited

U.S. PATENT DOCUMENTS

| | | |
|---|---|---|
| 5,762,379 A | 6/1998 | Salmon et al. |
| 6,113,149 A | 9/2000 | Dukatz |
| 6,170,881 B1 | 1/2001 | Salmon et al. |
| 6,628,460 B1 | 9/2003 | Ookawa et al. |
| 6,833,960 B1 | 12/2004 | Scarbrough et al. |
| 6,856,462 B1 | 2/2005 | Scarbrough et al. |

(Continued)

FOREIGN PATENT DOCUMENTS

WO    WO 2005/027696 A1    3/2005

*Primary Examiner* — Betelhem Shewareged
(74) *Attorney, Agent, or Firm* — Ladas & Parry LLP

(57) ABSTRACT

The invention provides a lenticular lens type three-dimensional image display device and a method of fabricating the device without a need for a clear plastic substrate transposed between the image and lenticular lenses. The device can be obtained by directly printing curable coatings onto the image, making them particularly well suited for volume production. The combination the image printing and application of curable coatings process can be joined together to conduct the single pass-process. The single pass-process allows for flexibility of the printing only selective areas of the substrate. Moreover, this process allows the device to be recyclable.

21 Claims, 3 Drawing Sheets

(56) References Cited

U.S. PATENT DOCUMENTS

| | | | |
|---|---|---|---|
| 7,290,803 B2 | 11/2007 | Scarbrough et al. | |
| 7,514,140 B2 | 4/2009 | Tsukuda | |
| 7,609,451 B1 | 10/2009 | Scarbrough | |
| 7,639,426 B2 | 12/2009 | Blondal et al. | |
| 2006/0239028 A1 | 10/2006 | Seaton | |
| 2006/0279945 A1* | 12/2006 | Hasei | G02F 1/133606 |
| | | | 362/97.3 |
| 2006/0285215 A1* | 12/2006 | Wu | G02B 3/0012 |
| | | | 359/619 |
| 2010/0154015 A1 | 6/2010 | Kang et al. | |
| 2010/0254015 A1* | 10/2010 | Booyens | B42D 25/382 |
| | | | 359/619 |
| 2011/0051396 A1 | 3/2011 | Liao et al. | |
| 2015/0293366 A1* | 10/2015 | Lin | G02B 27/2214 |
| | | | 428/29 |

\* cited by examiner

Figure 4. Lenticular Effect of the Entire Sheet
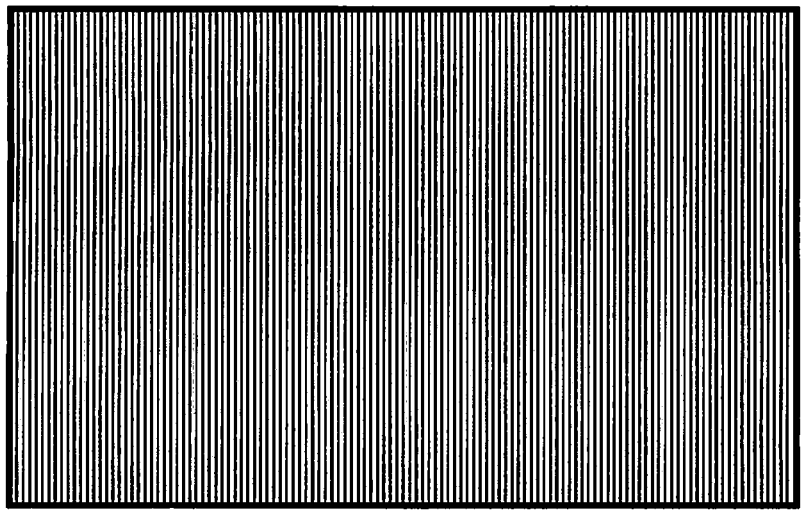
Figure 5. Spot Lenticular Areas and Various Lenticular Designs and Directions
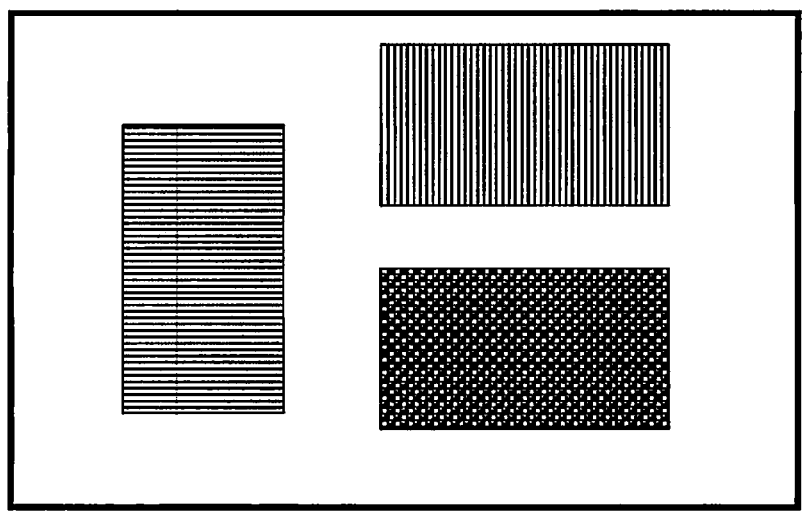

LENTICULAR PRINT THREE DIMENSIONAL IMAGE DISPLAY DEVICE AND METHOD OF FABRICATING THE SAME

CROSS-REFERENCE TO RELATED APPLICATION

This application claims priority to U.S. patent application Ser. No. 61/541,629 filed Sep. 30, 2011, the contents of which are incorporated herein by reference.

FIELD OF THE INVENTION

The present invention relates to a lenticular print three dimensional image display device, and a method of fabricating the device. The device can be obtained by directly printing ultraviolet curable coatings onto the image, making them particularly well suited for volume production.

BACKGROUND OF THE INVENTION

Lenticular print image display device is specially prepared graphics that are designed to work with a lenticular lens that allows the viewer to see different images depending on the angle at which it is viewed.

To impart a three dimensional effect, images are printed in an interlaced format. A lens sheet is place on top of the image that serves as a decoder for the image that is printed behind it. The lens sheet is a transparent plastic sheet that contains one side with lenticular lenses with a specific height, which have been extruded, cast, or embossed with an array of identical parallel lenses or a plurality of semispherical convex lenses arranged in a specific pattern. Conventional extrusion process generally provides a lens material thickness of about 10 mils (250 microns) to 40 mils (1000 microns) due to the extrusion process limitation. Also thicker lens materials minimize film distortion in lenticular print image devices. The other side of the lens sheet remains smooth. Images can be printed directly on this smooth side of the lens sheet (known as Direct-to-lens Process) or can be affixed onto the aforementioned side of the lens sheet.

Precise alignment of the image and lens sheet is paramount to achieve the desired three dimensional effects in a lenticular print. The image itself is a composite of two or more graphics that are interlaced together. Each individual lenticular lens must be perfectly aligned with the interlaced image underneath it in order for the effect to work. Based on the angle of the viewer, each lenticular lens acts as a magnifying glass to enlarge and display the portion of the image below. The lenticular lens receives light that passes from the direction of the flat surface toward the ridges and directs such light in a way that sends different portions of the light entering each lenticular lens to different portions of a viewing area in front of the lenticular lens. Plurality of lenticular lenses work in harmony to form the entire lenticular image. Thus, lenticular print can appear to show motion or even give off three-dimensional effect because each eye is viewing the lenticular print from its own angle.

The lenticular print image display device requires a transparent plastic lens sheet with a specific height. The lenticular lenses are formed atop of the transparent plastic lens to form the device.

In U.S. Pat. No. 7,514,140 to Tsukuda, issued Apr. 7, 2009, entitled "Acrylic Film for Lens Substrate, Lens Film Using the Same Lens Sheet," describes a lens substrate which requires an acrylic film. The film has a specific thickness, and a lens layer is created on top of the film to suppress any warping or sagging deformations.

In U.S. Pat. No. 7,639,426, issued Dec. 29, 2009, entitled "Micro-lens Enhanced Element," describes methods and apparatuses forming micro-lens enhanced images. The micro-lens apparatus also require a transparent layer with a specific thickness that separates an image from lenticular lens.

U.S. Pat. No. 6,628,460, issued Sep. 30, 2003, entitled "Lens Sheet and Method for Producing the Same," provides a lens sheet comprising a transparent substrate and a lens portion, with a relaxation layer between the transparent substrate and the lens portion. It is disclosed that the relaxation layer is 1-30% of the height of the lens unit.

US Pat. Publication No. 2006/0285215, published Dec. 21, 2006, entitled "Printing Method for Making a Lenticular Lens Material," provides a direct-to lens method for creating a lens material using energy curable inks and coatings. An image is printed on the back sheet of a transparent substrate sheet and the energy-curable ink is printed on the back sheet of the transparent substrate.

The above described lenticular print three dimensional image display lenses require a transparent sheet transposed between the lenticular lenses and the image with a specific thickness of the transparent sheet. The use of such technique typically requires the display to be co-extensive with the entire area of the image. However, cost, weight and other factors often cause a publisher to wish to avoid publishing entire pages of documents in lenticular form. Thus, for example, it may be useful to provide a three-dimensional image as a part of a sheet or page of a book, it is much less desirable to do so where such an image will occupy an entire page. Also, precision alignment and tight registration of the interlaced images with the lenticular lenses makes forming the lenticular device difficult. Corrections of the distortion of the lens due to misalignment require special printing techniques, custom equipment and set-up.

Thus, there remains a need for a simple, flexible and efficient method to create useful lenticular lens type three dimensional image displays. There is a further need for arrangement of lenticular lens that can be used with co-designed printed images to provide enhanced articles that provide particular visual effects and that can be formed in a reliable fashion using generally available commercial resources. The current invention fulfills this need.

BRIEF SUMMARY OF THE INVENTION

The invention provides a lenticular lens type three-dimensional image display device and a method of fabricating the device.

In one aspect, the lenticular print three dimensional image display device comprises: (A) a substrate with a proximate surface and a distal surface wherein an image is printed on a proximate surface; (B) a first curable coating composition that is applied on top of the printed image in a first pre-determined pattern; and (C) a second curable coating composition that is applied on top of the printed image, wherein the second curable coating composition self-registers into a second pattern that does not overlap with the first pre-determined pattern. The first curable coating composition comprises (i) at least one acrylate monomer, (ii) an acrylate oligomer with a backbone that comprises one or more groups selected from epoxy, polyester, urethane, acrylic and silicone, (iii) a photoinitiator, and (iv) a surface tension lowering additive. The second curable coating composition comprises (i) at least one acrylate monomer, (ii) an acrylate oligomer with a backbone that comprises one or more groups selected from epoxy, polyester, urethane, acrylic and silicone, and (iii) a photoinitiator. Both curable coating compositions are printed directly on the proximate surface, on top of the interlaced image, of the substrate and in registration of interlaced image design. Each curable coating composition has a surface energy, and the second curable coating composition has a liquid surface tension greater than at least 2 dynes/cm$^2$, as measured by ASTM D1084, than the surface tension of the cured first curable coating composition, as measured by ASTM D7490-08. The peak height of the cured second coating is at least two-times the peak height of the cured first coating.

Yet another aspect of the invention is directed to a method of fabricating a print three dimensional image display device comprising (1) printing an image on the proximate surface of a substrate, (2) applying a first curable coating composition on top of the interlaced image in a first pre-determined pattern, (3) curing the first curable coating composition, (4) applying a second curable coating composition on top of the interlaced image, wherein the second curable coating composition self registers into a second pattern that does not overlap with the first pre-determined pattern, and (5) curing the second curable coating composition, wherein the second curable coating composition has a liquid surface tension greater than at least 2 dynes/cm$^2$, as measured by ASTM D1084, than the surface tension of the cured first curable coating composition, as measured by ASTM D7490-08. The interaction of the two curable coating compositions results in a lens alignment that is in registration with the interlaced image to realize the desirable effect.

In another aspect of the invention is directed to a method of fabricating a print three dimensional image display device comprising (1) printing an image on the proximate surface of a substrate, (2) applying a first curable coating composition on top of the interlaced image in a first pre-determined pattern, (3) applying a second curable coating composition on top of the interlaced image in a second pre-determined pattern, wherein the second pre-determined pattern does not overlap with the first pre-determined pattern, and (4) curing both the first and second curable coating compositions, wherein the second curable coating composition has a liquid surface tension greater than at least 2 dynes/cm$^2$, as measured by ASTM D1084, than the surface tension of the cured first curable coating composition, as measured by ASTM D7490-08. The curable coating compositions are applied in a pre-determined pattern that is in registration with the interlaced image to realize the desirable effect.

BRIEF DESCRIPTION OF THE DRAWINGS

FIG. 4 is a top view of a lenticular print three dimensional device that is created on the entire sheet.

FIG. 5 is a top view of a spot lenticular print three dimensional device that contains various designs and directions.

DETAILED DESCRIPTION OF THE INVENTION

Figure 1:
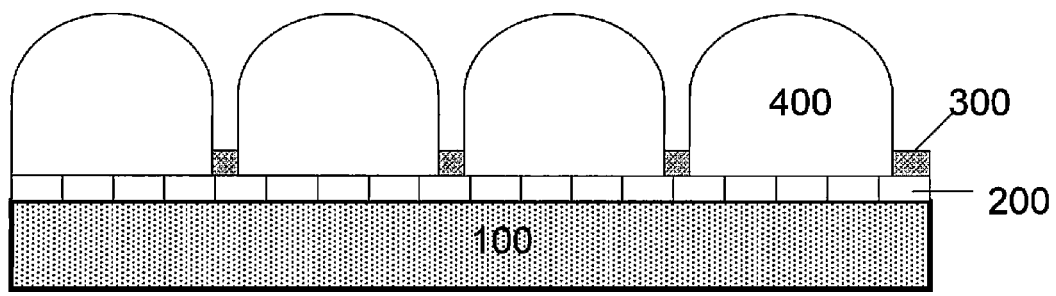
FIG. 1 is a lateral view of the lenticular print three dimensional image display device.

All references cited are incorporated herein.

The lenticular print three dimensional image display device comprises (A) an interlaced image printed on a substrate; (B) a first curable coating composition; and (C) a second curable coating composition. The curable coating compositions are applied directly onto the interlaced image, forming lenticular lenses. The device does not require a transparent sheet to be transposed between the lenticular lenses and the image.

Both curable coating compositions are optically transparent curable compositions. The first curable coating composition comprises (i) at least one acrylate monomer, (ii) an acrylate terminated oligomer, with a backbone of an epoxy, polyester, urethane, acrylic, silicone and mixtures thereof, (iii) a photoinitiator, and (iv) a surface tension lowering additive. The cured first curable coating composition has a surface tension less than 32 dynes/cm$^2$ as measured by ASTM D7490-08. The second curable coating composite comprises (i) at least one acrylate monomer, (ii) an acrylate terminated oligomer, with a backbone of an epoxy, polyester, urethane, acrylic, silicone and mixtures thereof, and (iii) a photoinitiator. The second curable coating composition has a liquid surface tension greater than at least 2 dynes/cm$^2$, as measured by ASTM D1084, than the surface tension of the cured first curable coating composition.

In one aspect the second curable coating composition has a liquid surface tension greater than 34 dynes/cm$^2$ as measured by ASTM D1084.

The curable coating compositions require at least one acrylate monomer. Acrylate monomers useful for the curable coating compositions include mono-functional, di-functional, tri-functional and multi-functional acrylate monomers. Exemplary mono-functional acrylate monomers include, but not limited to, octyl acrylate, decyl acrylate, 2-phenoxyethyl acrylate, isobornyl acrylate, 2(2-ethoxyethoxy)ethyl acrylate, ethoxylated nonylphenol acrylate, and the like. Exemplary di-functional acrylate monomers include, but not limited to, tripropylene glycol diacrylate, 1,6 hexanediol diacrylate, dipropylene glycol diacrylate, neopentyl glycol diacrylate, polyethylene glycol-200-diacrylate, polyethylene glycol-400-diacrylate, polyethylene glycol-600-diacrylate, triethylene glycol diacrylate, 3-ethoxylated bisphenol-A diacrylate, 4-ethoxylated bisphenol A diacrylate, 10-ethoxylated bisphenol-A diacrylate, 1,4-butanediol diacrylate, and the like. Exemplary tri-functional acrylate monomers include, but not limited to, trimethyol propane triacrylate, ethoxylated trimethyol propane triacrylate, 6-ethoxylated trimethyol propane triacrylate, 9-ethoxylated trimethyol propane triacrylate, 15-ethoxylated trimethyol propane triacrylate, 20-ethoxylated trimethyol propane triacrylate, propoxylated glyceryl triacrylate, and the like. Exemplary multi-functional acrylate monomers include, but not limited to, pentaerythritol tetraacrylate, di-trimethylol propane tetraacrylate, di-pentaerythriltol pentaacrylate, and the like.

Preferred acrylate monomers for both the first and the second curable coating compositions include isobornyl acrylate, 2(2-ethoxyethoxy)ethyl acrylate, tripropylene glycol diacrylate; 1,6 hexanediol diacrylate; neopentyl glycol diacrylate; trimethyol propane triacrylate; 6-ethoxylated trimethyol propane triacrylate, 9-ethoxylated trimethyol propane triacrylate, 15-ethoxylated trimethyol propane triacrylate, 20-ethoxylated trimethyol propane triacrylate, and propoxylated glyceryl triacrylate.

The curable coating compositions further comprise an acrylate oligomer that has backbones of epoxy, polyester, urethane, acrylic, silicone or mixtures thereof. Preferably, this acrylate oligomer component is an acrylate terminated oligomer with film-forming properties. For example, and without limitation, the oligomer of this embodiment can be an acrylate oligomer such as a polyester acrylate oligomer with a plurality of acrylate sequences per oligomer molecule. In some embodiments, the acrylate oligomer can have two to six acrylate sequences per oligomer molecule.

Examples of epoxy acrylate oligomers include, but are not limited to, bisphenol-A epoxy diacrylate (Ebecryl 3700, Ebecryl 3720 from Cytec; CN120, CN104 from Sartomer), modified bisphenol-A epoxy diacryalte (Ebecryl 3701 from Cytec), epoxy acrylate (CN121, CNUVE151 from Sartomer), and the like. Examples of acrylic acrylate oligomers include, but not limited to, CN2285 and CN549 from Sartomer. Typically, epoxy acrylate oligomers are available in a mixture with an acrylate monomer, wherein the oligomer is the major (typically greater than 50 weight percent) component of the mixture. Examples of polyester acrylate oligomers include, but are not limited to, CN292, CN293, CN704, CN2200 and CN2262 from Sartomer and Ebecryl 871 from Cytec; polyester tera-acrylate (Ebecryl 657 from Cytec), fatty acid modified polyester hexa-acrylate (Ebecryl 870), polyester tetra-acrylate (Ebecryl 810 from Cytec), and the like. Examples of urethane acrylate oligomers include, but are not limited to, aromatic urethane acrylate (Ebecryl 4827 from Cytec), aromatic urethane hexa-acrylate (Ebecryl 220), aliphatic urethane diacrylate (Ebecryl 230, Ebecryl 284, Ebecryl 4883, Ebecryl 8210 from Cytec; CN9009, CN9024, CN966, from Sartomer) and the like.

Preferred acrylate oligomer components include bisphenol-A epoxy diacrylate, and various monomer dilutions thereof. Also preferred are polyester tera-acrylate, fatty acid modified polyester hexa-acrylate, polyester acrylates; aromatic urethane acrylate, aliphatic urethane diacryalte, acrylic acrylate oligomer, and various monomer dilutions thereof.

The curable coating composition further comprises a photoinitiator. Examples of photoinitiator include, but not limited to, benzophenone, 4-methyl benzophenone, liquid benzophenone (Photomer 81 from Cognis), 4-phenylbenzyophenone, methyl-2-benzoylbenzoate, 2-hydroxy-2-methyl-1-phenyl-1-propanone, 1-hydroxy-cyclohexyl-phenyl-ketone, oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, benzyldimethyl ketal, 2-hydroxy-1[4-(2-hydroxyethoxyl)phenyl]-2-methyl-1-propanone, diphenyl (2,4,6-trimethylbenzoyl)-phosphine oxide, ethyl-2,4,6-trimethylbenzoylphenylphosphinate, phenyl bis (2,4,6-trimethyl benzoyl) phosphine oxide, blends of acyl phosphine oxide, alpha hydroxy ketone, phenyl-bis(2,4,6-trimethylbenzoyl)-phosphine oxide (Irgacure 2022, Irgacure 819, Irgacure 2100 from CIBA), difunctional-alpha-hydroxy ketone (Esacure one from Lamberti), oligo [2-hydroxy-2-methyl-1-[4-(1-methylvinyl) phenyl]propanone] (Esacure KIP150 from Lamberti), 1-propanone,1-[4-[(4-benzoylphenyl)thio]phenyl]-2-methyl-2-[(4-methylphenyl)sulfonyl] (Esacure 1001 from Lamberti), poly{1-[4-(phenylcarbonyl)-4'-(methyldiphenylsulphide)]ethylene}(Speedcure 7003 from Lambson), poly{1-[4-(phenylcarbonyl)phenyl]ethylene} (Speedcure 7006 from Lambson), 1,3-di({a-[1-chloro-9-oxo-9H-thioxanthen-4-yl)oxy]acetylpoly[oxy(1-methylethylene)]}oxy)-2,2-bis({a-[1-chloro-9-oxo-9H-thioxanthen-4-yl)oxy]acetylpoly[oxy(1-methylethylene)]} oxymethyl) propane (Speedcure 7010 from Lambson), poly{1-[4-(phenylcarbonyl)-4'-(chlorophenyl)]ethylene} (Speedcure 7020 from Lambson), 1,3-di({alpha-2-(phenylcarbonyl)benzoylpoly[oxy(1-methylethylene)]}oxy)-2,2-bis ({alpha-2-phenylcarbonyl)-benzoylpoly[oxy(1-methylethylene)]} oxymethyl) propane; {alpha-2-(phenylcarbonyl) benzoylpoly(oxyethylene)-poly[oxy(1-methylethylene)]-poly(oxyethylene)} 2-(phenylcarbonyl)benzoate; and mixtures thereof.

The above photoinitiator are commercially available as neat or in a mixture, such as, Irgacure 754 from CIBA (mixture of oxy-phenyl-acetic acid and 2-[2-oxo-2-phenyl-acetoxy-ethoxy]-ethyl ester and oxy-phenyl-acetic acid 2-[2-hydroxy-ethoxy]-ethyl ester); Darocur 4265 from BASF (blend of acyl phosphine oxide/alpha hydroxy ketone photoinitiator); and Speedcure 7005 (mixture of-1,3-di({alpha-2-(phenylcarbonyl)benzoylpoly[oxy(1-methylethylene)]}oxy)-2,2-bis ({alpha-2-phenylcarbonyl)-benzoylpoly [oxy(1-methylethylene)]} oxymethyl) propane and {alpha-2-(phenylcarbonyl)benzoylpoly(oxyethylene)-poly[oxy(1-methylethylene)]-poly(oxyethylene)} 2-(phenylcarbonyl) benzoate).

Preferred photoinitiators include benzophenone, methyl-2-benzoylbenzoate, 2-hydroxy-2-methyl-1-phenyl-1-propanone, 1-hydroxy-cyclohexyl-phenyl-ketone, mixture of mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester, ethyl-2,4,6-trimethylbenzoylphenyl phosphinate, diphenyl (2,4,6-trimethylbenzoyl)-phosphine oxide and mixtures thereof. Depending on the thickness of the film, a mixture of photoinitiators may be used to fully cure the film.

The first curable coating composition further comprises a surface tension lowering additive. Exemplary surface tension lowering additive for the first curable coating composition include siloxanes and silicone surfactants. The addition of this surface tension lowering additive lowers the surface tension of the first cured coating composition to less than 32 dynes/cm$^2$ as measured by ASTM D7490-08, also known as the contact angle method. Preferred surface tension lowering additives include, but not limited to, polydimethylsiloxanes, dimethicones, organo modified polysiloxanes, cyclopentasiloxanes, silicone oils such as methyl silicone oil and dimethyl silicone oil, organofunctional silanes, and the like, and blends or mixtures thereof. The siloxanes and silicone surfactants can also include copolymers or graft polymers, such as silicone acrylate, silicone polyether acrylate, polyether siloxane copolymer, polysiloxane polyether copolymer. The preferred siloxanes and silicone surfactants have viscosities that range from about 100-2500 mPa·sec at 77° C.

The siloxanes for the first curable coating compositions include radically crosslinkable silicone acrylate, acrylated polysiloxanes and acrylated polyorganosiloxane. More preferred siloxanes include those that exhibit release coating characteristics after curing, especially with peel force less than 30 g/inch.

Preferred siloxanes and silicone surfactants for the first curable coating composition include radically cross-linkable silicone polyether acrylate (TEGO Rad 2100, TEGO Rad 2250 from Evonik), radically crosslinkable silicone acrylate (TEGO Rad 2500, TEGO 2650TEGO Rad 2700 from Evonik), polyether siloxane copolymer (TEGO Glide 410 from Evonik), acrylated polysiloxanes (TEGO RC922, RC902, RC711 from Evonik), organo modified silicone polymer (CoatOSil 3573 from Momentive Performance Materials), polyalkyleneoxide modified polydimethylsiloxane (Silwet L-7602 from Momentive Performance Materials), polydimethylsiloxanes (SF-96 from Momentive Performance Materials, available with viscosities of 5, 10, 20, 50, 100, 200, 350, 500 and 1000 centistokes), nonreactive silicone glycol copolymer surfactant (Dow Corning 57 Additive from Dow Corning); and polyether modified polydimethylsiloxane (BYK-UV 3510 from BYK Chemie), acrylated polyorganosiloxanes (Sicolease PC900, Sicolease PC970 from Blue Star Silicones) and mixtures thereof.

The second curable coating composition has a surface tension greater than at least 2 dynes/cm$^2$, preferably 3 dynes/cm$^2$, as measured by ASTM D1084, than the first curable coating composition. While not bound to any theory, the surface tension difference allows the two curable compositions to self-assemble into a desired pattern.

In one embodiment, the liquid surface tension of the second curable coating composition is greater than 34 dynes/cm$^2$, as measured by ASTM D1084, and the surface tension of the first cured coating composition is less than 32 dynes/cm$^2$, as measured by ASTM D7490-08. While not committed to any theory, the particular selections the first and the second curable coating compositions allow for thermodynamic capability to self-assemble into lenticular lens shape. This surface tension gradient difference allows the second curable coating composition to self-assemble into uniform lenticular lens with peak heights at least two times greater than the first cured coating composition.

The curable coating compositions optionally comprise a cure accelerator, which can be in the form of non-crosslinkable tertiary amine or crosslinkable tertiary amine. Examples of non-crosslinkable amine cure accelerators include, but not limited to, methyl diethanolamine, triethanolamine, n-butyldiethanolamine, ethyl-4-(dimethylamino) benzoate, 2-ethylhexyl-4-(dimethylamino)benzoate, 2-(dimethylamino)ethylbenzoate, poly[oxy(methyl-1,2-ethyanediyl)], alpha-[4-(dimethylamino)benzoyl-butoxy, poly[oxy(methyl 1,2-ethanediyl)], alpha-[4-(dimethylamino)benzoyl-alpha-butoxy (Speedcure PDA from Lambson), and butoxyethyl-4-(dimethylamino)benzoate. Examples of crosslinkable amine cure accelerator include, but not limited to Ebecryl P104 from Cytec, Ebecryl 83, Ebecryl P115, Ebecryl 7100 from Cytec; Etercure 7417, Etercure 6410, Etercure 6420 (from Eternal Chemicals Co.); Speedcure 7040, Omnirad Cl-250 from IGM Resin, 2-propenoic acid and 2-ethyl-2-(((1-oxo-2-propenyl)oxy) methyl)-1,3-propanediyl ester.

Preferred tertiary amines include diethanolamine, triethanolamine, 2-propenoic acid, 2-ethyl-2-(((1-oxo-2-propenyl) oxy)methyl)-1,3-propanediyl ester, ethyl-4-(dimethylamino) benzoate and mixtures thereof.

Optional additives such as antioxidants, stabilizers, antimisting agents, defoamers, flow additives, fillers, dyes, optical brighteners, can be added up to about 10 wt % of the curable coating composition.

The curable coating compositions are formed by combining the solid and liquid components together. Heat and mixing can be adjusted to form a uniform coating composition.

The viscosities of the coating compositions can be adjusted to suit a particular application method and to obtain a desired thickness or meniscus curvature of the coated materials (400). For instance, application of the first coating by means of lithographic printing requires high viscosity, e.g., more than about 2000 mPa·sec at 50° C. On the other hand, application by means of flexographic printing of the first coating composition requires lower viscosity, e.g., 150-3000 mPa·sec at 25° C. Application by means of ink jet printing of the first coating composition requires a viscosity less than 60 mPa·sec at the application temperature of the ink jet print head. One skilled in the art can adjust the viscosity of the first coating composition to suit various printing limitations.

The first coating is applied in registration (in a predetermined pattern) with the interlaced image into a desirable thickness and the composition is then cured. The term, "curing" means drying, heating or curing by means of an energy source, such as, but not limited to, thermal cure, ultraviolet light (200-500 nm), electron beam, or light emitting diode or any other high energy light source. The preferred curing method is ultraviolet light curing. The cured height of the first coating composition ranges from about 0.05-0.3 mil thickness.

The viscosity of the second curable composition ranges from about 150 to about 10,000 mPa·sec at 25° C., preferably from about 200 to about 3000 mPa·sec at 25° C. The viscosity of the second curable coating can be adjusted to suit various printing methods. The liquid surface tension of the second curable coating composition is above 34 dynes/cm$^2$, as measured by ASTM 1084, to build a cured height of at least two times the height of the first curable coating composition.

Another aspect is directed to the method of fabricating the lenticular print three dimensional image display device. The method comprises:
  (i) printing an interlaced image on the proximate surface of a substrate;
  (ii) applying a first curable coating composition on top of the interlaced image in a first pre-determined pattern;
  (iii) curing the first curable coating composition;
  (iv) applying a second curable coating composition on top of the interlaced image, wherein the second curable coating composition self-registers into a second pattern that does not overlap with the first pre-determined pattern; and
  (v) curing the second curable coating composition;
wherein the second curable coating composition has a liquid surface tension greater than at least 2 dynes/cm$^2$ than the liquid surface tension of the first curable coating composition, as measured by ASTM D1084. The curable coating compositions are applied in a pre-determined pattern that is in registration with the interlaced image to realize the desired effect.

Yet another aspect is directed to the method of fabricating the lenticular print three dimensional image display device. The method comprises:
  (i) printing an interlaced image on the distal surface of a substrate, wherein the substrate is transparent;
  (ii) applying a first curable coating composition onto the proximate surface of the substrate in a first pre-determined pattern;
  (iii) curing the first curable coating composition;
  (iv) applying a second curable coating composition onto the proximate surface of the substrate, wherein the second curable coating composition self-registers into a second pattern that does not overlap with the first pre-determined pattern; and
  (v) curing the second curable coating composition;
wherein the second curable coating composition has a liquid surface tension greater than at least 2 dynes/cm$^2$, as measured by ASTM D1084, than the surface tension of the cured first curable coating composition, as measured by ASTM D7490-08. The curable coating compositions are applied in a pre-determined pattern that is in registration with the interlaced image to realize the desirable effect.

In another aspect of the invention is directed to a method of fabricating a print three dimensional image display device. The method comprises:
  (i) printing an image on the proximate surface of a substrate;
  (ii) applying a first curable coating composition on top of the interlaced image in a first pre-determined pattern;
  (iii) applying a second curable coating composition on top of the interlaced image in a second pre-determined pattern, wherein the second pre-determined pattern does not overlap with the first pre-determined pattern; and
  (iv) curing both the first and second curable coating compositions;
wherein the second curable coating composition has a liquid surface tension greater than at least 2 dynes/cm$^2$ than the liquid surface tension of the first curable coating composition, as measured by ASTM D1084. The curable coating compositions are applied in a pre-determined pattern that is in registration with the interlaced image to realize the desirable effect.

Any printing techniques to print an interlaced image may be used including offset printing, gravure printing, ink jet printing, lithography printing, flexographic printing, silk-screen printing, air brushing and the like. Lithography and flexographic printing, in particular, are preferred due to its high resolution, high speed and ease of use.

To give off the effect of a three dimensional display, an interlaced image (200) is printed on a substrate. Exemplary substrates include paper and plastic sheets, including oriented polypropylene, polystyrene, polyvinylchloride, polycarbonate, polyethylene, polyethylene terephthalate and acrylic. Preferably for paper substrates, the paper is coated with clay or sealed with a primer to avoid excessive dive-in of the inks and coatings.

The lenticular lenses are fabricated directly on the printed images without a transparent lens sheet transposed between the image and the lenticular lenses. The transparent curable coating compositions are applied directly onto the image to form the lenticular lenses with sufficient thickness to realize the three-dimensional effect. They are formed in the shape of a parallel (corrugated) lines or a domes (silo) patterns (as described in U.S. Pat. No. 7,130,126 and U.S. Pat. No. 5,644,431), where the pattern is highly uniform.

In one embodiment, the first curable coating (300 in Figures) is applied directly onto the printed interlaced image. The first coating can be applied in a controlled manner which develops into a pre-determined pattern that is in registration with the interlaced images. The pattern can range from relatively parallel lines (300 in FIGS. 1 and 2), or the area outside of semi-cylindrical dome or rectangular dome (300 in FIG. 3). The pattern and registration of the first curable coating to the images are applied through the registration mechanism of the printing/application device. The first curable coating develops a specific height on the image. The first coating composition is then cured into a cured first coating.

Optionally, air or heated air can be blown onto the device to aid in reducing the viscosity of the first curable coating composition.

The second coating (400 in Figures) is applied onto the image. The second curable coating composition self-registers into a second pattern that does not overlap with the first pre-determined pattern. In another embodiment, the second curable coating composition is applied on top of the interlaced image in a second pre-determined pattern, wherein the second pre-determined pattern does not overlap with the first pre-determined pattern.

The second curable coating may be applied as a flood coat (FIG. 4) to cover the entire sheet or spot-coated only in designated areas where the lenticular effect is desired (FIG. 5). Desirably, spot lenticular effect can be created in certain targeted areas of the substrate. The spot lenticular effect also allows for a mixture of various three-dimensional designs in a single sheet, and the direction of each design can also be varied (FIG. 5).

The self-assembling and self-registering properties of the second curable coating form the lenticular lenses. The differences in the surface tensions allow the second curable coating to retract from the cured first coating. Due to this repelling interaction, the second curable coating develops into convex meniscus with a height that is at least two times greater than the cured first coating on the image. The coatings can be applied in various patterns, such as relative parallel lines in semi-cylindrical forms (FIG. 2, 400), semi-circular/silo shape (FIG. 3, 400) or rectangular domes.

Optionally, air or heated air can be blown onto the device, particularly to the proximate surface where the second coating has been applied onto, to aid in reducing the viscosity of the second curable coating composition and accelerates the self-assembly speed.

The second coating composition is then cured to a cured second coating.

In another aspect, fabrication of the lenticular print three dimensional image display device can be completed in a single pass-process. All of the printing steps and curing steps can be set-up in a series to allow for a single pass process. In one process, the image is be printed on the proximate surface of a substrate; a first curable coating composition is applied directly on the printed image in a first pre-determined pattern; the first curable coating composition is cured; a second curable coating composition is applied on the printed image wherein the second curable coating composition self-registers into a second pattern that does not overlap with the first pre-determined pattern; and the second curable coating composition is cured to form the device.

Application methods such as, but not limited to, offset printing, gravure printing, ink jet printing, lithography printing, flexographic printing, silk-screen printing and air brushing can be retro-fitted to perform a single pass-process to form the display device. Also, a combination of the above noted printing methods can be joined together to conduct the single pass-process. The single pass-process allows selective spot printing (rather than printing to the entire area) of the substrate. With this selectivity, the displays can be prepared in various angles to the substrate, and thus no longer limited to a perpendicular pattern to the substrate.

Depending upon the choice of printer/applicator/coater, the viscosity of the second curable coating composition can be modified to suit the printing/application/coating process. In one embodiment, the second curable coating composition is applied with a flexographic coater in a flexographic (flexo) press. In another embodiment, the second curable coating composition is applied with a flexographic coater at the end of a lithographic press, where the first coating is printed by means of lithographic printing. Yet in another embodiment, both coating compositions can be applied by means of ink jet printing process. Methodologies that allows for high volume is desirable for forming the lenticular lens. In one embodiment, this can be accomplished by a high volume anilox with cell volume of about 50 to about 110 bcm/in$^2$. This amount of coating can be adjusted by techniques described in "High volume, texture liquid transfer surface" (U.S. Pat. No. 5,908,505) and "Direct printing device" (US2008/0302262). The thickness of each coating can be adjusted by means of viscosity and application method to achieve second cured coating of at least two times, preferably three times, more preferably four times higher than the height of the first cured coating.

The aforementioned processes do not require the use of a transparent plastic substrate to be transposed between the image and the lenticular lenses. Without the need for the transparent plastic substrate, the device is more flexible and lighter. Images can be printed on paper substrates, including high gloss paper such as magazine covers. Paper substrates with the device can also be recyclable without the additional cost and energy of separating out the plastic substrate. Cost of the device and the method significantly decreases due to higher throughput and selective application on substrates.

EXAMPLES

Example 1

First Curable Coating Composition for Litho Application

The components of first curable coating are shown in Table 1. This UV-curable coating was prepared by mixing the first seven components at about 60° C. on a hot plate to dissolve the solid components with a saw-tooth mixing blade in a stainless steel container. After the solids were completely dissolved, monomer and defoamer were added to the container and mixed until uniform. The remaining components were then added and mixed until uniform. The viscosity of the coating was about 2050 mPa·sec (measured using Brookfield Viscometer, model LV using #3 spindle, 30 rpm at 50° C.). The coating was applied with Little Joe Ink Proofer to simulate lithographic ink station. Surface tension of the cured coating, measured in accordance with ASTM D7490-08, was 27.7 dyne/cm$^2$.

TABLE 1

| | First Coating-Litho Version | |
|---|---|---|
| | Component | wt % |
| Acrylate oligomer #1 | Ebecryl 3720TM20 (80% Bisphenol-A-epoxy diacrylate oligomer diluted in 20% Trimethylolpropane triacrylate monomer) (Cytec) | 69.50 |
| Acrylate oligomer #2 | CN9167US (Sartomer) | 10.05 |
| Photoinitiator #1 | 1-hydroxy-cyclohexylphenyl ketone (BASF/Ciba)) | 6.00 |
| Photoinitiator #2 | Benzil dimethyl ketal (BASF/Ciba) | 1.50 |
| Stabilizer | Hydroquinone monomethyl ether (Rhodia) | 0.15 |
| Additive - optical brightener | Unitex OB (BASF/Ciba) | 0.10 |
| Cure accelerator | ethyl-4-(dimethylamino)benzoate (IGM Resin) | 1.00 |
| Acrylate monomer | Propoxylated glyceryl triacrylate (Sartomer) | 4.13 |
| Additive - defoamer | Foamblast 20F (Emerald Performance Materials) | 0.07 |
| Additive - filler | Aerosil R972 (Evonik/Degussa) | 0.50 |
| Acrylated polyorganosiloxane | Silcolease PC 900 (Blue Star Silicones) | 5.00 |
| Additive - flow control | Paint additive DC57 (Dow Corning) | 2.00 |
| | Total | 100.00 |

Example 2

First Curable Coating Composition for Flexo Application

Another example of first coating is shown in Table 2. This example is directed to flexo coater application. This coating was prepared by mixing the first six components at about 40° C. on a hot plate to dissolve the solid components with a saw-tooth mixing blade in stainless steel container. After the solids were dissolved, the mixture was cooled and the remaining components were then added and mixed until uniform. The viscosity of the coating was about 220 mPa·sec (measured using Brookfield Viscometer, model LV using #4 spindle, 60 rpm at 25° C.). The coating was applied with lab flexo hand proofer unit (from Cavanagh Corporation) to simulate a flexo coater. Surface tension of the cured coating, measured in accordance with ASTM D7490-08, was 30.6 dyne/cm$^2$.

TABLE 2

First Coating - Flexo Version

| | Component | wt % |
|---|---|---|
| Acrylate monomer | Trimethylolpropane triacrylate (Sartomer) | 45.00 |
| Acrylate Oligomer | Ebecryl 3720TM20 (80% Bisphenol-A-epoxy diacrylate oligomer diluted in 20% Trimethylolpropane triacrylate monomer) (Cytec) | 20.30 |
| Acrylate monomer | Tripropylene glycol diacrylate (Sartomer) | 4.00 |
| Photoinitiator #1 | 2-hydroxyl-2 methyl-1-phenylpropanone (IGM Resin) | 1.00 |
| Photoinitiator #2 | Benzophenone (IGM Resin) | 15.00 |
| Additive - Optical brightener | Unitex OB (BASF/Ciba) | 0.07 |
| Additive - flow additive | Paint additive DC57 (Dow Corning) | 1.60 |
| Cure accelerator | 2-Propenoic acid, 2-ethyl-2-(((1-oxo-2-propenyl)oxy)methyl)-1,3-propanediyl ester (Henkel) | 2.00 |
| | Triethanol amine (non-crosslinkable) (Ashland) | 6.00 |
| Additive - defoamer | Suppressor 2131 (Hydrite Chemical Co.) | 0.03 |
| Acrylated polysiloxane | Tego RC902 (Evonik) | 5.00 |
| | Total | 100.00 |

Example 3

Second Curable Coating Composition for Flexo Application

An example of a second coating is shown in Table 3. This example is directed to flexo coater application. This coating was prepared by mixing the first ten components at about 40° C. on a hot plate to dissolve the solid components with a saw-tooth mixing blade in stainless steel container. After the solids were dissolved, the mixture was cooled and the remaining components were then added and mixed until the mixture was uniform. The viscosity of the coating was about 900-1,200 mPa·sec (measured using Brookfield Viscometer, model LV using #3 spindle, 30 rpm at 25° C.). The coating was applied with flexo hand proofer unit (from Cavanagh Corporation) to simulate a flexo coater. Surface tension in the uncured state, measured in accordance with ASTM D1084, was 34.4 dyne/cm$^2$.

TABLE 3

Second Coating - Flexo Version

| | Component | Wt % |
|---|---|---|
| Acrylate monomer | Tripropylene glycol diacrylate (Sartomer) | 19.00 |
| Acrylate Oligomer | Ebecryl 3720TM20 (80% Bisphenol-A-epoxy diacrylate oligomer diluted in 20% Trimethylolpropane triacrylate monomer) (Cytec) | 6.50 |
| Acrylate Oligomer | Ebecryl 3720TP40 (60% Bisphenol-A-epoxy diacrylate oligomer diluted in 40% Tripropylene glycol diacrylate monomer) (Cytec) | 40.10 |
| Acrylate Oligomer | Ebecryl 4827 (Cytec) | 6.00 |
| Acrylate Oligomer | CN704 (Sartomer) | 18.00 |
| Photoinitiator #1 | 1-hydroxy-cyclohexylphenyl ketone (BASF/Ciba) | 3.50 |
| Photoinitiator #2 | Benzil dimethyl ketal (BASF/Ciba) | 1.40 |
| Photoinitiator #3 | Lucirin TPO-L (BASF) | 0.25 |
| Additive - stabilizer | Hydroquinone monomethyl ether (Rhodia) | 0.10 |
| Additive - Optical brightener | Unitex OB (BASF/Ciba) | 0.15 |
| Cure accelerator | Methyldiethanolamine (non-crosslinkable) (Ashland) | 5.00 |
| | Total | 100.00 |

Example 4

Second Coating Composition for Flexo Application

Another example of a second coating is shown in Table 4. This example is directed to flexo coater application. This coating was prepared by mixing the first eight components at about 40° C. on a hot plate to dissolve the solid components with a saw-tooth mixing blade in stainless steel container. After the solids were dissolved, the mixture was cooled and the remaining components were then added and mixed until uniform. The viscosity of the coating was about 200-270 mPa·sec (measured using Brookfield Viscometer, model LV using #3 spindle, 30 rpm at 25° C.). Surface tension in the uncured state, measured in accordance with ASTM D1084, was 36.0 dyne/cm$^2$.

TABLE 4

Second coating - Flexo Version

| | Component | Wt % |
|---|---|---|
| Acrylate monomer | Trimethylolpropane triacrylate (TMPTA) monomer (Sartomer) | 21.85 |
| Acrylate Oligomer | Ebecryl 3720 TM40 (Cytec) | 37.00 |
| Acrylate monomer | 2(2-ethoxyethoxy)ethyl acrylate (Sartomer) | 10.00 |
| Acrylate monomer | Tripropylene glycol diacrylate | 4.92 |

TABLE 4-continued

Second coating - Flexo Version

| | Component | Wt % |
|---|---|---|
| Additive - Optical brightener | Unitex OB (BASF/Ciba) | 0.1 |
| Photoinitiator #1 | 2-hydroxyl-2 methyl-1-phenylpropanone (photoinitiator) (BASF/Ciba) | 4.00 |
| Photoinitiator #2 | 1-hydroxy-cyclohexylphenyl ketone (BASF/Ciba) | 2.50 |
| Photoinitiator #3 | Benzil dimethyl ketal (BASF/Ciba) | 1.50 |
| Cure accelerator | 2-Propenoic acid, 2-ethyl-2-(((1-oxo-2-propenyl)oxy)methyl)-1,3-propanediyl ester (CAS#68002-34-6) (Henkel, 9086M) | 8.15 |
| Cure accelerator | Triethanolamine 99% (Ashland) | 3.63 |
| Acrylate monomer | EB4849 (Cytec) | 5.00 |
| Acrylate monomer | Trimethylolpropane triacrylate (TMPTA) monomer (Sartomer) | 0.90 |
| Wax additive | Lo Angle 5413 (Shamrock Technologies) | 0.45 |
| | Total | 100.00 |

Example 5

Second Coating Composition for Flexo Application

Comparative Example

Another example of a second coating is shown in Table 5. This example is directed to flexo coater application. This coating was prepared by mixing the first eight components at about 40° C. on a hot plate to dissolve the solid components with a saw-tooth mixing blade in stainless steel container. After the solids were dissolved, the mixture was cooled and the remaining components were then added and mixed until uniform. The viscosity of the coating was about 200-270 mPa·sec (measured using Brookfield Viscometer, model LV using #3 spindle, 30 rpm at 25° C.). Surface tension in the uncured state, measured per ASTM D1084, was 20.2 dyne/cm$^2$.

TABLE 5

Second Coating for Comparative Example A

| | Component | Wt % |
|---|---|---|
| Acrylate monomer | Trimethylolpropane triacrylate (TMPTA) monomer (Sartomer) | 19.85 |
| Acrylate oligomer | Ebecryl 3720 TM40 (Cytec) | 37.00 |
| Acrylate monomer | 2(2-ethoxyethoxy)ethyl acrylate (Sartomer) | 10.00 |
| Acrylate monomer | Tripropylene glycol diacrylate | 4.92 |
| Additive - Optical brightener | Unitex OB (BASF/Ciba) | 0.10 |
| Photoinitiator #1 | 2-hydroxyl-2 methyl-1-phenylpropanone (photoinitiator) (BASF/Ciba) | 4.00 |
| Photoinitiator #2 | 1-hydroxy-cyclohexylphenyl ketone (BASF/Ciba) | 2.50 |
| Photoinitiator #3 | Benzil dimethyl ketal (BASF/Ciba) | 1.50 |
| Cure accelerator | copolymerizable amine synergist (2-Propenoic acid, 2-ethyl-2-(((1-oxo-2-propenyl)oxy)methyl)-1,3-propanediyl ester (CAS#68002-34-6) (Henkel, 9086M) | 8.15 |
| Cure accelerator | Triethanolamine 99% (Ashland) | 3.63 |
| Acrylate monomer | EB4849 (Cytec) | 5.00 |
| Acrylate monomer | Trimethylolpropane triacrylate (TMPTA) monomer (Sartomer) | 0.90 |
| Wax additive | Lo Angle 5413 (Shamrock Technologies) | 0.45 |
| Additive - flow additive | Paint additive DC57 (additive: flow from Dow Corning) | 2.00 |
| | Total | 100.00 |

Example 6

Application

Figure 2:
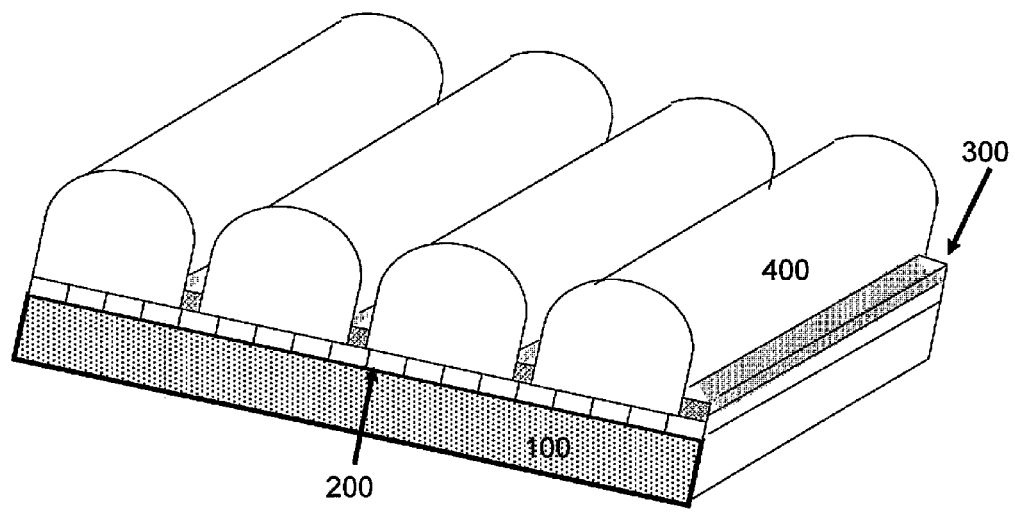
FIG. 2 is a top view of the lenticular print three dimensional image display device with parallel lenticular lenses.
Figure 3:
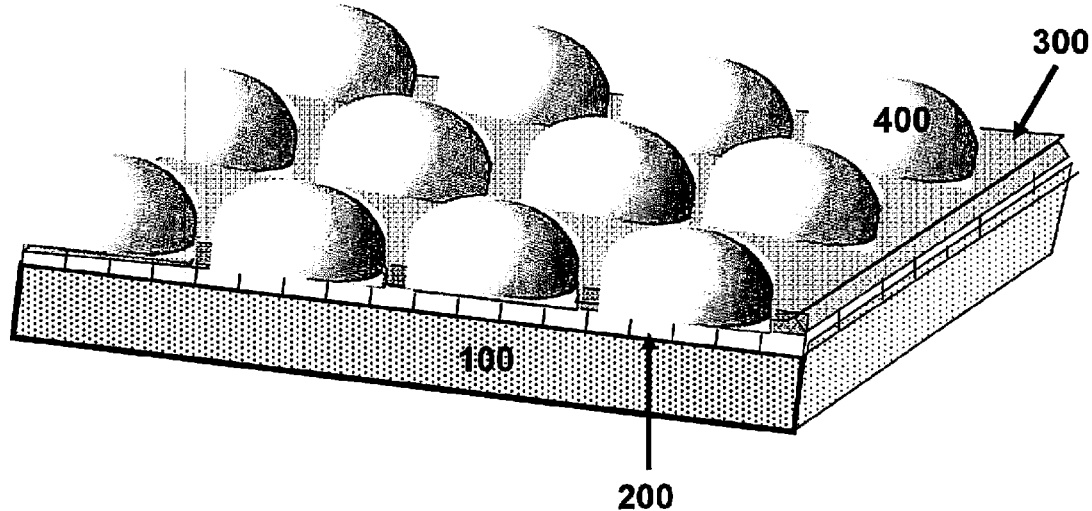
FIG. 3 is a top view of the lenticular print three dimensional image display device with silo-shaped lenticular lenses.

First coating, Table 1, was with applied with Little Joe Ink Proofer (Little Joe Corporation, 1.5 gm) and using rubber roller to transfer the coating onto a photopolymer plate with a 30 LPI (lines per inch) fine line pattern, then this interlace line pattern was printed on C1S paperboard to create the first pre-determined pattern as shown in 300 in FIG. 2. It was then cured with Lab UV curing unit, Fusion F300S, at 100 mJ/cm$^2$ as measured by UVICURE Plus II radiometer. The second coating, Table 3, was applied with Cavanagh Corporation flexo hand proofer with 53 bcm anilox on top of the cured first coating area as flood coat. The second curable coating composition self-assembled into uniform lenticular lens that did not overlap with the first pre-determined pattern as shown in 400 in FIG. 2. Hot air (40-50° C. hair dryer) was blown onto the second curable composition, and this aided the speed of the self registration from 5-10 seconds to 2-3 seconds. The second coating was then cured with Lab UV curing unit, Fusion F300S, at 100 mJ/cm² as measured by UVICURE Plus II radiometer. The example created the overall pattern as shown in FIG. 2.

Example 7

Application

First coating, Table 2, was with applied with Cavanagh Corporation flexo hand proofer with 12 bcm anilox roller onto a photopolymer plate with a 62 LPI fine line pattern, then this interlace line pattern is printed on C1 S paperboard to create the first pre-determined pattern as shown in 300 in FIG. 2. It was then cured with Lab UV curing unit, Fusion F300S, at 100 mJ/cm² as measured by UVICURE Plus II radiometer. It has a surface tension of 30.6 dynes/cm². The second coating, Table 4, was then applied with Cavanagh Corporation flexo hand proofer with 53 bcm anilox on top of the cured first coating area as flood coat. The second curable coating composition self-assembled into uniform lenticular lens that did not overlap with the first pre-determined pattern as shown in 400 in FIG. 2. Hot air (40-50° C. hair dryer) was blown onto the second curable composition, and this aided the speed of the self registration from 5-10 seconds to 2-3 seconds. The second coating was then cured with Lab UV curing unit, Fusion F300S, at 100 mJ/cm² as measured by UVICURE Plus II radiometer. The example created the overall pattern as demonstrated in FIG. 2.

Example 8

Comparative Example A

Surface Tension Gradient is Less than 2 Dyne/Cm²

First coating, Table 2, was with applied with Cavanagh Corporation flexo hand proofer with 12 bcm anilox roller onto a photopolymer plate with a 30 LPI fine line pattern, then this interlace line pattern is printed on C1S paperboard to create the first pre-determined pattern as shown in 300 in FIG. 2. It was then cured with Lab UV curing unit, Fusion F300S, at 100 mJ/cm² as measured by UVICURE Plus II radiometer. Coating described in Table 5 was used as the second coating with liquid surface tension of 20.2 dynes/cm², as measured by ASTM D1084, and was applied with Cavanagh Corporation flexo hand proofer with 53 bcm anilox on top of the cured first coating area as flood coat. The second coating covered up the line pattern (first pre-determined pattern) and formed a uniform layer that did not self-register into a second pattern. The second coating was then cured with Lab UV curing unit, Fusion F300S, at 100 mJ/cm² as measured by UVICURE Plus II radiometer. The combination of these two coating did not results in a self-registered pattern.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I claim:

1. A lenticular print three dimensional image display device comprising:
   (A) a substrate with a proximate surface and a distal surface wherein an interlaced image is printed on either surface of the substrate;
   (B) a first curable coating composition that comprises (i) at least one acrylate monomer, (ii) an acrylate oligomer with a backbone that comprises one or more groups selected from epoxy, polyester, urethane, acrylic and silicone, (iii) a photoinitiator, and (iv) a surface tension lowering additive; and wherein the first curable coating composition is applied on the proximate surface of the substrate in a first pre-determined pattern on the proximate surface of the substrate; and
   (C) a second curable coating composition that comprises (i) at least one acrylate monomer, (ii) an acrylate oligomer with a backbone that comprises one or more groups selected from epoxy, polyester, urethane, acrylic and silicone, and (iii) a photoinitiator;
   wherein the second curable coating composition is applied on the proximate surface of the substrate, and wherein the second curable coating composition self-registers into a second pattern that does not overlap with the first pre-determined pattern; and
   wherein the liquid surface tension of the second curable coating composition is at least 2 dynes/cm², as measured by ASTM D1084, higher than the surface tension of the cured first curable coating composition, as measured by ASTM D7490-08.

2. The lenticular print three dimension image display device of claim 1 wherein the liquid surface tension of the second curable coating composition is at least 2 dynes/cm² higher than the surface tension of the cured first curable coating composition.

3. The lenticular print three dimension image display device of claim 1 wherein the interlaced image is printed on the proximate surface of the substrate.

4. The lenticular print three dimensional image display device of claim 1 wherein the substrate is paper or plastic film.

5. The lenticular print three dimensional image display device of claim 4 wherein the paper is a clay-coated paper or a primer-sealed paper.

6. The lenticular print three dimensional image display device of claim 4 wherein the plastic film is an oriented polypropylene, polystyrene, polyvinylchloride, polycarbonate, polyethylene, polyethylene terephthalate or acrylic.

7. The lenticular print three dimensional image display device of claim 1 wherein the acrylate monomer is selected from the group consisting of mono-functional acrylate monomers, di-functional acrylate monomers, tri-functional acrylate monomers, multi-functional acrylate monomers and mixtures thereof.

8. The lenticular print three dimensional image display device of claim 1 wherein the acrylate oligomer is selected from the group consisting of epoxy acrylate oligomer, polyester acrylate oligomer, urethane acrylate oligomer, acrylic acrylate oligomer, silicone acrylate oligomer and mixtures thereof.

9. The lenticular print three dimensional image display device of claim 1 wherein the surface tension lowering additive is selected from the group consisting of polydimethylsiloxanes, silicone acrylate, silicone polyether acrylate, polyether siloxane copolymer, polysiloxane polyether copolymer, dimethicones, organo modified polysiloxanes, cyclopentasiloxanes, silicone oils, organofunctional silanes, and mixtures thereof.

10. The lenticular print three dimensional image display device of claim 1 wherein the second curable coating has a viscosity ranges from about 150 to about 10,000 mPa·sec at 25° C.

11. The lenticular print three dimensional image display device of claim 1 further comprising a cure accelerator.

12. The lenticular print three dimensional image display device of claim 11 wherein the cure accelerator is selected from the group consisting of methyl diethanolamine, triethanolamine, n- butyldiethanolamine, ethyl-4-(dimethylamino)benzoate, 2-ethylhexyl-4-(dimethylamino)benzoate, 2-(dimethylamino)ethylbenzoate, poly [oxy(methyl-1,2-ethyanediyl)], alpha-[4-(dimethylamino)benzoyl-butoxy, poly[oxy(methyl 1,2-ethanediyl)], alpha-[4- (dimethylamino)benzoyl-alpha-butoxy, butoxyethyl-4-(dimethylamino)benzoate, 2-propenoic acid, 2-ethyl-2-(((1-oxo-2-propenyl)oxy)methyl)-1,3-propanediyl ester and mixtures thereof.

13. A method of fabricating a print three dimensional image display device comprising: (i) printing an interlaced image on the proximate surface of a substrate;
   (ii) applying a first curable coating composition on top of the interlaced image in a first pre-determined pattern;
   (iii) curing the first curable coating composition;
   (iv) applying a second curable coating composition on top of the interlaced image, wherein the second curable coating composition self-registers into a second pattern that does not overlap with the first pre-determined pattern; and
   (v) curing the second curable coating composition;
   wherein the liquid surface tension of the second curable coating composition is at least 2 dynes/cm$^2$, as measured by ASTM D1084, higher than the surface tension of the cured first curable coating composition, as measured by ASTM D7490-08.

14. The method of fabricating a print three dimensional image display device of claim 13 wherein an air is blown on the proximate surface of the substrate after step (iv) and before step (v).

15. The method of fabricating a print three dimensional image display device of claim 14 wherein the air blown on the proximate surface is heated air.

16. The method of fabricating a print three dimensional image display device of claim 13 wherein the first curable coating composition is applied to the proximate surface in a plurality of lines, semicircular domes or rectangular domes.

17. The method of fabricating a print three dimensional image display device of claim 13 wherein the curing of the first curable coating composition is with ultraviolet radiation.

18. The method of fabricating a print three dimensional image display device of claim 13 wherein the method is a single-pass process comprising:
   (i) flexographic printing an interlaced image onto a proximate surface of a substrate;
   (ii) flexographic printing a first curable coating composition onto the proximate surface of the substrate;
   (iii) curing the first curable coating composition;)
   flexographic printing a second curable coating composition onto the proximate surface of the substrate; and
   (v) curing the second curable coating composition.

19. The method of fabricating a print three dimensional image display device of claim 13 wherein the method is a single-pass process comprising:
   (i) lithography printing an interlaced image onto a proximate surface of a substrate;
   (ii) lithography printing a first curable coating composition onto the proximate surface of the substrate;
   (iii) curing the first curable coating composition;
   (iv) flexographic printing a second curable coating composition onto the proximate surface of the substrate; and
   (v) curing the second curable coating composition.

20. The method of fabricating a print three dimensional image display device of claim 13 wherein the method is a single-pass process comprising:
   (i) ink jet printing an interlaced image onto a proximate surface of a substrate;
   (ii) flexographic printing a first curable coating composition onto the proximate surface of the substrate;
   (iii) curing the first curable coating composition;
   (iv) flexographic printing a second curable coating composition onto the proximate surface of the substrate; and
   (v) curing the second curable coating composition.

21. A method of fabricating a print three dimensional image display device comprising:
   (i) printing an interlaced image on the proximate surface of a substrate;
   (ii) applying a first curable coating composition on top of the interlaced image in a first pre-determined pattern;
   (iii) applying a second curable coating composition on top of the interlaced image in a second pre-determined pattern, wherein the second pre-determined pattern does not overlap with the first pre-determined pattern; and
   (iv) curing the first and the second curable coating compositions simultaneously;
   wherein the second curable coating composition has a liquid surface tension greater than at least 2 dynes/cm$^2$ than the liquid surface tension of the first curable coating composition, as measured by ASTM D1084.

* * * * *